(12) United States Patent
Wilkinson

(10) Patent No.: US 7,429,047 B1
(45) Date of Patent: Sep. 30, 2008

(54) PISTON RING ASSEMBLY

(75) Inventor: Daniel Wilkinson, Spring Lake, MI (US)

(73) Assignee: Mahle Engine Components USA, Inc., Muskegon, MI (US)

( * ) Notice: Subject to any disclaimer, the term of this patent is extended or adjusted under 35 U.S.C. 154(b) by 567 days.

(21) Appl. No.: 10/605,988

(22) Filed: Nov. 12, 2003

(51) Int. Cl.
B60T 11/236 (2006.01)

(52) U.S. Cl. ............... 277/434; 277/467; 277/472; 277/474

(58) Field of Classification Search ......... 277/434–435, 277/459, 467, 469–474, 475–476, 478–480, 277/481–482, 485–486
See application file for complete search history.

(56) References Cited

U.S. PATENT DOCUMENTS

| | | | | |
|---|---|---|---|---|
| 1,470,263 A | * | 10/1923 | Heslewood et al. | 277/446 |
| 1,492,673 A | | 5/1924 | Case | |
| 1,836,027 A | * | 12/1931 | Hellman | 277/446 |
| 1,877,461 A | | 9/1932 | Hodge | |
| RE20,256 E | * | 1/1937 | Wuerfel | 277/457 |
| 2,148,997 A | * | 2/1939 | Phillips | 277/478 |
| 2,272,531 A | * | 2/1942 | Shannon | 277/478 |
| 2,299,963 A | * | 10/1942 | Colwell et al. | 277/480 |
| 2,323,815 A | * | 7/1943 | Landon | 277/480 |
| 2,349,903 A | * | 5/1944 | Fall | 277/447 |
| 2,424,881 A | | 7/1947 | Fall | |
| 2,670,256 A | | 2/1954 | Pien | |
| 3,000,678 A | * | 9/1961 | Gunther | 277/473 |
| 3,055,669 A | * | 9/1962 | Knoebel | 277/478 |
| 3,627,333 A | | 12/1971 | Hill | |
| 4,183,544 A | | 1/1980 | Morsbach et al. | |
| 4,210,338 A | * | 7/1980 | Collings, Jr. | 277/472 |
| 4,759,266 A | | 7/1988 | Murray | |
| 5,308,089 A | * | 5/1994 | Ishida | 277/443 |

FOREIGN PATENT DOCUMENTS

JP          06050208 A   *   2/1994

* cited by examiner

*Primary Examiner*—Vishal Patel
(74) *Attorney, Agent, or Firm*—Rader, Fishman & Grauer PLLC

(57) ABSTRACT

A piston ring assembly includes an upper ring, a lower ring and an expander disposed between the upper and lower rings. When assembled, the piston ring assembly is positioned with a groove of a piston. During down stroke of the piston, the upper and lower rings radially compress. This radial compression induces axial expansion of the expander, thereby urging the upper and lower rings against upper and lower surfaces of the groove. The piston ring assembly provides a seal between not only an outer periphery and a wall of a cylinder, but also between the piston ring assembly and the annular groove of the piston to prevent escape of oil and gases.

18 Claims, 3 Drawing Sheets

PISTON RING ASSEMBLY

FIELD OF INVENTION

The present invention relates to a piston ring assembly having an upper ring, a lower ring and an expander positioned therebetween, and more particularly to a piston ring assembly having an expander such that radial compression upon the upper and lower rings induces axial expansion of the expander.

BACKGROUND OF THE INVENTION

A piston reciprocates within a cylinder of an internal combustion engine and compresses fluids, such as gases, within a combustion chamber of the cylinder. These compressed fluids are then ignited to expand within the combustion chamber thereby forcing the piston away from the point of ignition and cycling the piston to its original position.

Piston ring assemblies are typically received within an annular groove disposed about an outer periphery of a piston. The primary function of piston ring assemblies is to provide an effective seal. This is typically accomplished by placing a first piston ring assembly, called a compression ring, near an uppermost portion of the piston. The compression ring is designed to seal during up-stroke of the piston to compress gases within the combustion chamber. Further, the piston ring assemblies also prevent excess lubricating oil from entering the combustion chamber during down-stroke of the piston. Typically, a second piston ring, called an oil ring, is placed below the compression ring to prevent oil from escaping into the combustion chamber.

Outer peripheries of the piston ring assemblies contact a wall of the cylinder to form the seal. As a result of manufacturing tolerances and material expansion due to heat generated by the engine, the fit of the piston ring assemblies within the grooves fluctuates. Accordingly, oil or combustion gases may still escape through a gap between the surfaces of the piston ring assembly and its associated groove. The escape of oil and combustion gases results in a less efficient engine.

Accordingly, there is a need for an improved piston ring assembly that increases engine efficiency by providing an effective seal between not only the outer periphery of the piston ring assembly and the cylinder wall, but also between surfaces of the piston ring assembly and the associated annular groove of the piston.

BRIEF SUMMARY OF THE INVENTION

The present invention is directed to a piston ring assembly comprising an upper ring and a lower ring. An expander is positioned between the upper ring and the lower ring and includes apexes adapted to contact the upper ring and the lower ring, wherein radial compression applied to the upper and lower rings induces axial expansion of the expander.

DETAILED DESCRIPTION OF THE INVENTION

Figure 1:
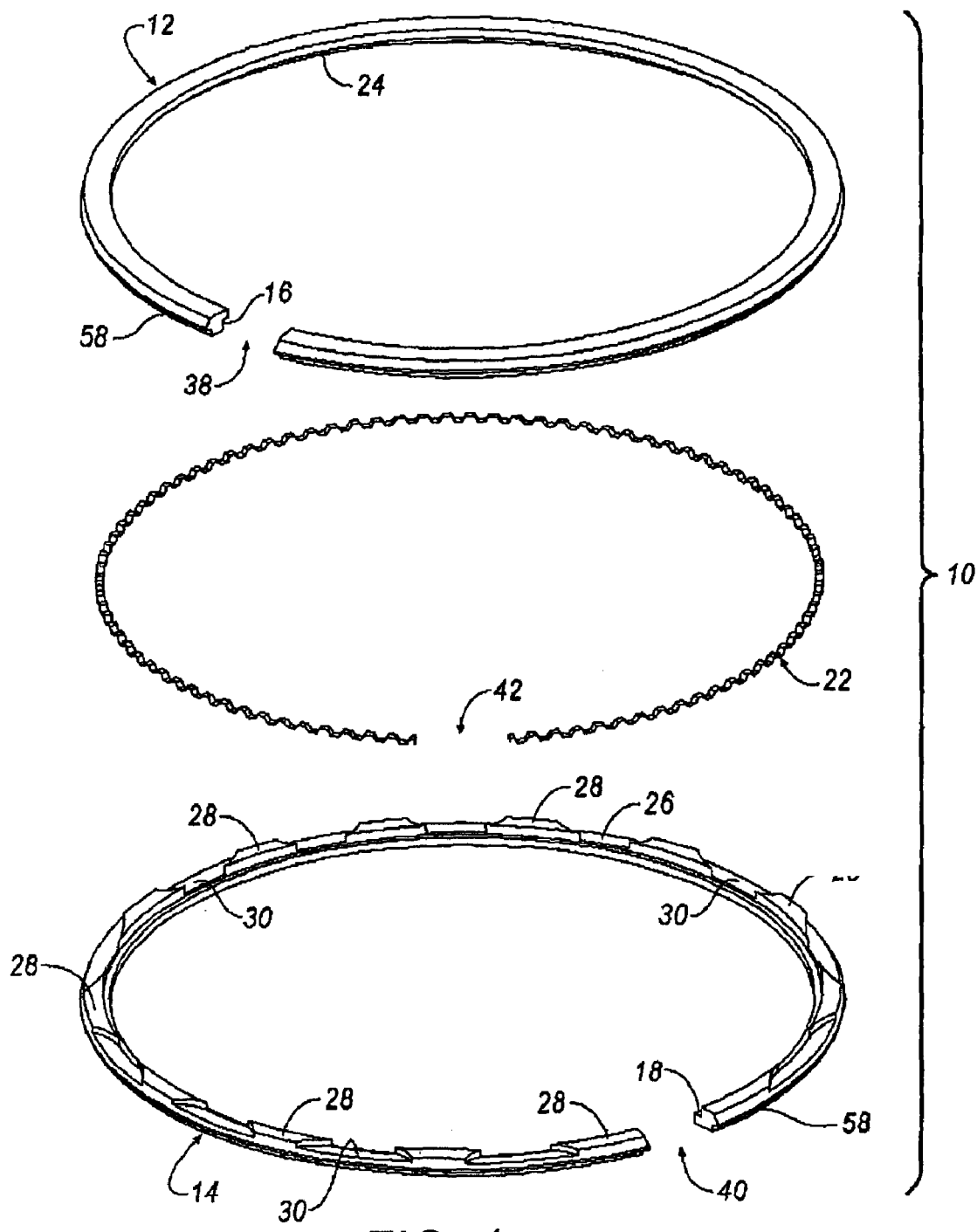
FIG. 1 is an exploded view of a piston ring assembly of the present invention.
Figure 2:
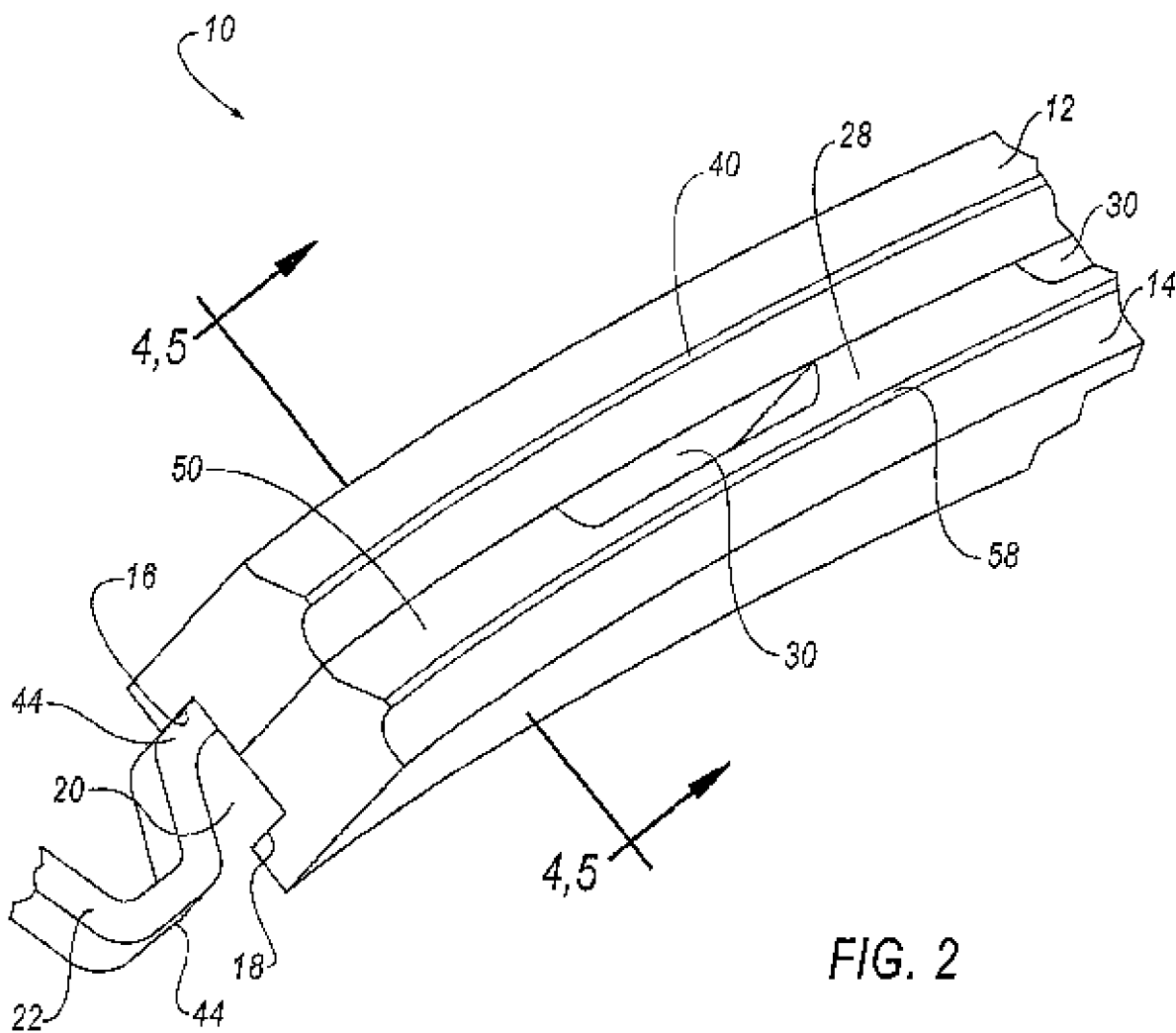
FIG. 2 is a sectional perspective view of the piston ring assembly of the present invention.

Referring now to FIGS. 1 and 2, a piston ring assembly of the present invention is shown generally at 10. The piston ring assembly 10 includes an upper ring 12 and a lower ring 14. The upper ring 12 includes a first shoulder recess 16 about an inner periphery while the lower ring 14 includes a second shoulder recess 18 about an inner periphery. When the upper and lower rings 12, 14 are mated, the first and second shoulder recesses 16, 18 define a cavity 20 therebetween. The piston ring assembly 10 also includes an expander 22 positioned between the upper and lower rings 12, 14 within the cavity 20.

Each of the rings 12, 14 includes a mating inner surface 24, 26, respectively. One of the mating inner surfaces 24, 26 of either the upper ring 12 or the lower ring 14 includes a plurality of projections 28. The projections 28, as illustrated in FIG. 1, are included on the mating inner surface 26 of the lower ring 14 and have a generally triangular shape in accordance with one embodiment of the present invention. As seen in FIG. 2, when the piston ring assembly 10 is assembled the mating inner surfaces 24, 26 and plurality of projections 28 define a plurality of vents 30. The vents 30 alternate about the piston ring assembly 10 to allow oil to drain back through the piston ring assembly 10 into holes 32 in an annular ring groove 34 of a piston 36.

Again, as seen in FIG. 1, the upper ring 12 includes a first ring gap 38, while the second ring 14 includes a second ring gap 40. The gaps 38, 40 are typically offset from each other when the rings 12, 14 are assembled into the piston ring assembly 10. Offsetting the gaps 38, 40 makes it more difficult for oil to pass through the piston ring assembly 10 and escape into the combustion chamber. As contemplated by the invention, the upper and lower rings 12, 14 are generally made of steel, cast iron or the like. However, any material contemplated by one skilled in the art may be utilized. Furthermore, the expander 22 also includes an expander gap 42. As illustrated in FIG. 1, the expander gap 42 is also typically offset from the first and second ring gaps 38, 40 when assembled into the piston ring assembly 10.

Figure 3:
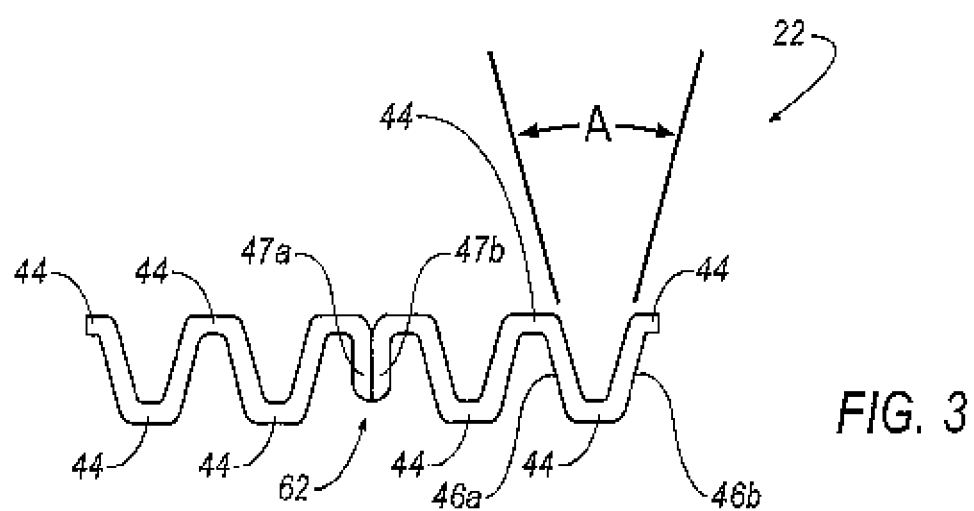
FIG. 3 is a sectional flat side view of an expander of the piston ring assembly when ends of the expander engage each other during radial compression of the expander.

In accordance with one aspect of the invention, the expander 22 is generally sinusoidal in shape having alternating apexes 44, as shown in FIG. 3. The alternating apexes 44, as illustrated, are generally flat surfaces. However, the apexes 44 may be of any shape such that the apexes 44 of the expander 22 are adapted to contact the upper and lower rings 12, 14 when positioned within the cavity 20. The illustrated embodiment of generally flat apexes 44 is not intended to be limiting. For example, the apexes 44 may be rounded or pointed.

Each apex 44 separates leg members 46a, 46b that define an angle A, with respect to each other. In the illustrated embodiment, the angle, A, is approximately sixteen (16) degrees. However, the invention can be practiced with other angles, A, to produce a desired amount of spring force exerted by the expander 22 against the upper and lower rings 12, 14. The expander 22 is generally made from stainless steel, however, any suitable material may be used as determined by one skilled in the art. The expander 22 also includes ends 47a, 47b that are substantially parallel to each other.

Figure 4:
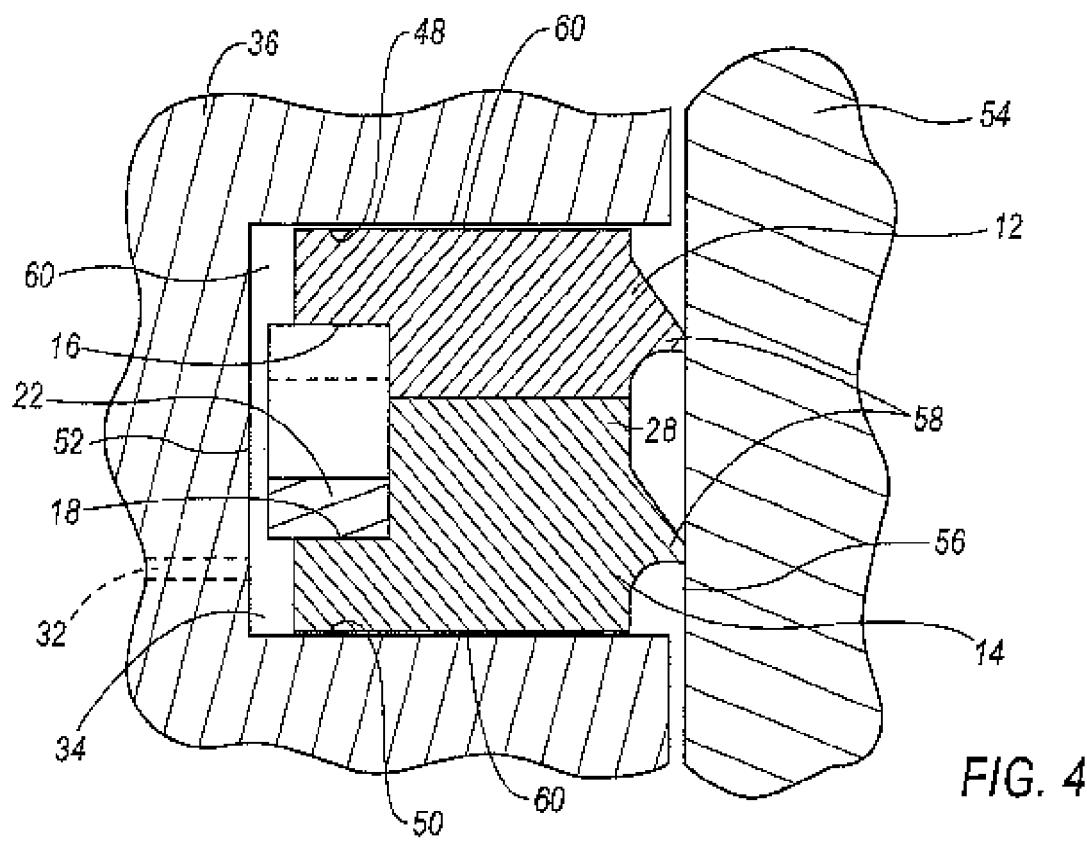
FIG. 4 is a partial cut-away cross-sectional view of the piston ring assembly while positioned within an annular groove of a piston taken along the line 4-4 of FIG. 2 while the expander is in a relaxed state.

Referring now to FIG. 4, the piston ring assembly 10 is positioned within the annular ring groove 34 of the piston 36. The ring groove 34 has an upper surface 48 and a lower surface 50 at opposite ends of a base surface 52. The upper and lower surfaces 48, 50 of the ring groove 34 are proximate to the upper and lower rings 12, 14, respectively.

FIG. 4 illustrates the piston ring assembly 10 when in a generally relaxed state. When positioned within the cavity 20, the expander 22 has a thickness greater than the width of the shoulder recesses 16, 18 such that a portion of the expander 22 extends radially outwardly from the upper and lower rings 12, 14 toward the base surface 52. In the relaxed state, although the expander 22 extends toward the base surface 52, contact between the inner periphery of the expander 22 and the base surface 52 of the piston is generally avoided. The diameter of the inner periphery of the expander 22 is generally larger than the outer diameter of the piston 36. Furthermore, in the relaxed state the apexes 44 of the expander 22 are in contact with the first and second shoulder recesses 16, 18. The contact between the apexes 44 and the shoulder recesses 16, 18, however, exerts only a minimal force upon the rings 12, 14.

Figure 5:
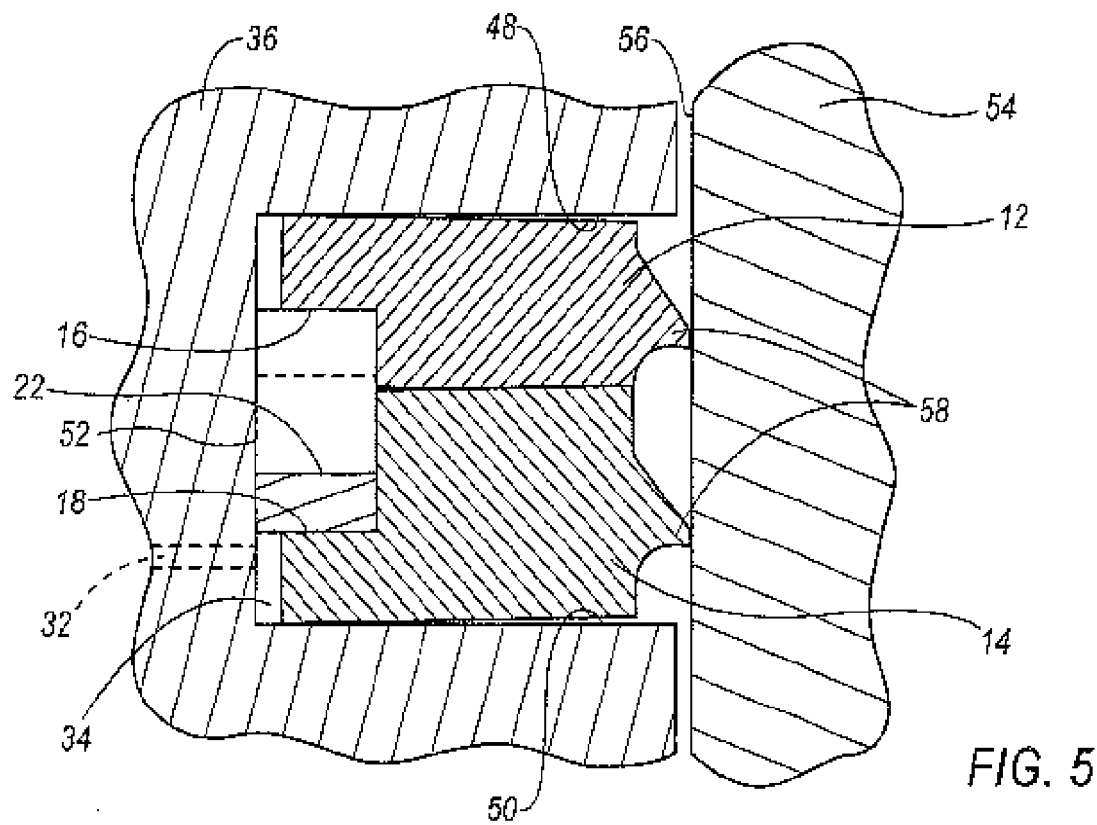
FIG. 5 is a partial cut-away cross-sectional view of the piston ring assembly positioned within the annular groove of the piston taken along the line 5-5 of FIG. 2 where the expander is in a compressed state.

As illustrated in FIGS. 4-5, the piston 36 reciprocates within a cylinder 54. The cylinder 54 has a cylinder wall 56 generally surrounding the piston 36. Each of the upper and lower rings 12, 14 of the piston ring assembly 10 includes a lip 58 extending about the outer periphery. When assembled, the lip 58 of each ring 12, 14 contacts the cylinder wall 56 to form a seal that prevents the escape of gases and oil during reciprocation of the piston 36.

As illustrated in FIG. 4, in the relaxed state, passageways 60 are disposed between the piston ring assembly 10 and the upper, lower and base surfaces 48, 50, 52 of the ring groove 34. During the downstroke of the piston 36, oil may escape into the combustion chamber through the passageways 60. Accordingly, eliminating the passageways 60 will prevent the escape of oil into the combustion chamber, resulting in a more efficient engine.

In accordance with an embodiment of the invention, during the down stroke of the piston 36, compression is directed radially inward from the outer periphery of the piston ring assembly 10. The radial compression is applied to the upper and lower rings 12, 14 at the contact point between the lips 58 of each ring 12, 14 and the cylinder wall 56. The radial compression of the upper and lower rings 12, 14 induces axial expansion of the expander 22, causing the two generally parallel ends 47a, 47b defining the expander gap 42 to mate to form a generally W-shaped configuration, shown generally at 62 in FIG. 3. The W-shaped configuration 62 is only one example of mating the ends 47a, 47b of the expander gap 42 during compression. Any configuration to mate the ends 47a, 47b of the expander gap 42 that induces axial expansion of the expander 22 when the piston ring assembly 10 is subjected to radial compression is contemplated by the present invention. Additionally, the first and second ring gaps 38, 40 also narrow during radial compression of the piston ring assembly 10, but typically never completely close. The clearance remaining between the ends of each ring gap 38, 40 varies with the diameter of the piston 36, material properties and the force of radial compression.

As seen in FIG. 5, upon further axial expansion the expander 22 buckles, resulting in an increased force between the alternating apexes 44 of the expander 22 and the first and second shoulder recesses 16, 18 of the upper and lower rings 12, 14. Accordingly, the upper ring 12 is urged against the upper surface 48 of the ring groove 34, while the lower ring is urged against the lower surface 50 of the ring groove 34. The passageways 60 previously existing between the piston ring assembly 10 and the upper and lower surfaces 48, 50 of the ring groove 34 are minimized or eliminated. Furthermore, the inner periphery of the expander 22 is pressed into contact with the piston 36, thereby eliminating the passageway 60 between the expander 22 and the base surface 52. Therefore, oil and gases are prevented from escaping between the piston ring assembly 10 and the ring groove 34 through the passageway 60, thereby resulting in a more effective seal than conventional ring assemblies.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

The invention claimed is:

1. A piston ring assembly, comprising:
   an upper ring;
   a lower ring;
   wherein a first portion of said upper ring is in contact with a corresponding first portion of said lower ring; and
   an expander positioned between corresponding second portions of said upper ring and said lower ring, said expander including apexes adapted to contact said second portions of said upper and lower rings;
   wherein radial compression of said upper and lower rings induces axial expansion of said expander.

2. A piston ring assembly according to claim 1, wherein upon positioning the piston ring assembly within a ring groove of a piston, said axial expansion of said expander urges said upper ring against an upper surface of said ring groove and said lower ring against a lower surface of said ring groove.

3. A piston ring assembly according to claim 1, wherein said upper ring includes a first shoulder recess about an inner periphery thereof and said lower ring includes a second shoulder recess about an inner periphery thereof, said first and second shoulder recesses defining a cavity to receive said expander.

4. A piston ring assembly according to claim 1, wherein said expander is generally sinusoidal in shape and includes two ends defining an expander gap such that radial compression of said upper and lower rings mates said two ends thereby closing said expander gap and said mated two ends form a generally W-shaped configuration.

5. A piston ring assembly according to claim 1, wherein said apexes of said expander are generally flat and are supported by two adjacent leg members such that an angle defined by said adjacent leg members is about 16 degrees.

6. A piston ring assembly according to claim 1, wherein said upper ring includes a first ring gap and said lower ring includes a second ring gap.

7. A piston ring assembly according to claim 1, wherein said upper and lower rings each include a lip extending about an outer periphery thereof.

8. A piston ring assembly according to claim 1, wherein one of said upper ring and said lower ring include a plurality of projections on a mating inner surface to define a plurality of vents.

9. A piston ring assembly for retention in a ring groove of a piston of an internal combustion engine, comprising:
   an upper ring for bearing against an upper surface of the piston ring groove, said upper ring defining a first shoulder recess about an inner periphery thereof;
   a lower ring for bearing against a lower surface of the piston ring groove, said lower ring defining a second shoulder recess about an inner periphery thereof, wherein a first portion of said upper ring is in direct contact with a corresponding first portion of said lower ring;

said first and second recesses defining a cavity; and a generally sinusoidal expander received in said cavity, said generally sinusoidal expander having alternating apexes, said apexes adapted to contact second corresponding portions of said upper and lower rings, wherein radial compression of said upper and lower rings induces axial expansion of said generally sinusoidal expander for urging said upper and lower rings against the upper and lower surfaces of the piston ring groove.

10. A piston ring assembly according to claim 9, wherein said generally sinusoidal expander includes two ends defining an expander gap such that radial compression of said upper and lower rings mates said two ends, thereby closing said expander gap and said mated two ends form a generally W-shaped configuration.

11. A piston ring assembly according to claim 9, wherein said apexes of said expander are generally flat and are supported by two adjacent leg members such that an angle defined by said adjacent leg members is about 16 degrees.

12. A piston ring assembly according to claim 9, wherein said upper and lower rings each include a lip extending about an outer periphery thereof.

13. A piston ring assembly according to claim 9, wherein said upper ring includes a first ring gap and said lower ring includes a second ring gap.

14. A piston ring assembly according to claim 9, wherein one of said upper and lower rings include a plurality of projections on a mating inner surface to define a plurality of vents.

15. A piston ring assembly according to claim 1, wherein the apexes comprise a set of upper apexes and a set of lower apexes, the set of upper apexes is spaced apart from the set of lower apexes in the axial direction of the expander, the set of upper apexes contacts the second portion of the upper ring, and the set of lower apexes contacts the second portion of the lower ring.

16. A piston ring assembly according to claim 9, wherein the apexes comprise a set of upper apexes and a set of lower apexes, the set of upper apexes is spaced apart from the set of lower apexes in the axial direction of the expander, the set of upper apexes contacts the second portion of the upper ring, and the set of lower apexes contacts the second portion of the lower ring.

17. A piston ring assembly according to claim 3, wherein said cavity has a radial thickness, said expander has a radial thickness, and said expander radial thickness is greater than said cavity radial thickness.

18. A piston ring assembly according to claim 9, wherein said cavity has a radial width, said expander has a radial width, and said expander radial thickness is greater than said cavity radial width.

* * * * *